United States Patent [19]

Tanguy et al.

[11] Patent Number: 5,020,080
[45] Date of Patent: May 28, 1991

[54] DEMODULATION METHOD AND DEMODULATOR FOR DIGITAL SIGNALS WITH AMPLITUDES OF CONSTANT ENVELOPE, CONTINUOUSLY MODULATED IN PHASE AND/OR IN FREQUENCY

[75] Inventors: Yannick Tanguy, Paris; José Robineau, Ste Genevieve des Bois, both of France

[73] Assignee: Thomson-CSF, Puteaux, France

[21] Appl. No.: 370,864

[22] Filed: Jun. 23, 1989

[30] Foreign Application Priority Data

Jun. 24, 1988 [FR] France ............................ 88 08525

[51] Int. Cl.$^5$ ............................................. H04L 27/14
[52] U.S. Cl. ........................................ 375/80; 375/84; 329/313
[58] Field of Search ................ 375/80, 84, 85, 94; 329/311, 313, 315, 345; 371/43

[56] References Cited

U.S. PATENT DOCUMENTS 4,242,641 12/1980 Houdard ..................... 375/85 X
4,862,483 8/1989 Clark ............................. 375/94

FOREIGN PATENT DOCUMENTS 0094040 11/1983 European Pat. Off. .

OTHER PUBLICATIONS

IEEE Transactions on Communications, vol. COM-33, No. 12, Dec. 1985, pp. 1285-1290, IEEE, NY U.S., S. J. Simmons, et al.
IEEE Global Telecommunications Conference, Houston, Tex, Dec. 1-14, 1986, 'Communications Broadening Technology Horizons', Conf. Record, vol. 2 & 3, pp. 1078-1082, G. Troullinos.

*Primary Examiner*—Benedict V. Safourek
*Assistant Examiner*—Tesfaldet Bocure
*Attorney, Agent, or Firm*—Oblon, Spivak, McClelland, Maier & Neustadt

[57] ABSTRACT

The disclosed method consists in sampling the phase of the detected modulated signal, inside each symbol T period, with a comb of sampling pulses obtained from N clock pulses evenly spaced out by a time interval equal to T/N; computing the differential phase angle $d\phi$ between symbols for each phase sample of the detected current symbol, encoding each differential phase angle $d\phi$ in assigning it an encoding cost, computing the sums of the encoding costs for the samples of the same order belonging to a determined number L of consecutive symbols; memorizing, among the N sums obtained, that sum which gives the greatest result, taking, as a symbols synchronizing clock, that clock which, in the comb of pulses, has the same order as the order of the sample which have lead to the greatest sum and decoding the differential phase angle having the same order as the memorized sample.

9 Claims, 6 Drawing Sheets

DEMODULATION METHOD AND DEMODULATOR FOR DIGITAL SIGNALS WITH AMPLITUDES OF CONSTANT ENVELOPE, CONTINUOUSLY MODULATED IN PHASE AND/OR IN FREQUENCY

BACKGROUND OF THE INVENTION

1. Field of the Invention

The present invention concerns a demodulation method and a demodulator for digital signals with amplitudes having a constant envelope, continuously modulated in phase and/or in frequency.

It concerns, notably, methods for the demodulation of radio-electrical, digital data carrier signals and their uses in systems for the transmission of data by packets or frequency hopping.

In these methods, the items of data to be transmitted are converted into the form of sequences of symbols of constant duration forming the Baud interval of the transmission to modulate, in frequency or phase, a carrier wave with an amplitude having a constant envelope. The value of these methods lies, above all, in the fact, that they lead to lower frequency occupancy rates than those of the transmission systems known as FSK (frequency shift keying) or PSK (phase shift keying) that use rectangular symbols.

2. Description of the Prior Art

An example of a system implementing a method for the modulation of a continuously phase modulated carrier with an amplitude having a constant envelope is known from the French patent application No.82 08043.

According to the modulation system described, the transmission modulator has an encoder, which makes discrete phase jump values correspond to the data or symbols to be transmitted, and a symbol synthesizer which, as a function of the data given by the encoder, prepares a form of continuous phase variation with a minimum slope, expressed as a function of time by a polynomial relationship. The reception demodulator uses synchronous demodulation and operates by correlation to recover the characteristic instants of the modulation of the frequency deviation between the transmission and reception carriers.

This system has the advantage of using a narrow frequency bandwidth with respect to the throughput rate of the data that it transmits and of enabling, for example, transmission of data at 16 K bits/s in 25 KHz wide channels, with an attenuation of 50 dB outside the channel.

However, the demodulator proves to be complicated to make when the data transmission systems have to transmit data in packets or by frequency hopping, notably because of the complexity of the device for the estimation of the symbol clock used. Since this device has one specific function to estimate the the continuous component and one specific function to estimate the symbol clock, conditioned by the estimation of the continuous component, the effects due to the natural noise of the transmission and those due to the frequency deviation of the reception control oscillator with respect to that of the transmission oscillator are not dissociated. The result thereof is that the performance characteristics of the synchronizing circuit keep deteriorating as and when the transmission gets infested with noise.

SUMMARY OF THE INVENTION

An aim of the invention is to overcome the above-mentioned drawbacks.

To this effect, an object of the invention is a method for the demodulation of digital signals with an amplitude having a constant envelope, continuously modulated in phase and/or frequency, the digital signals consisting of sequences of symbols that have the same duration T and are juxtaposed with one another in time, the symbols being transmitted by means of phase and/or frequency jumps, said method consisting in:

detecting the phase of the signal modulated in the form of a signal with an amplitude that is variable as a function of the phase variations of the modulating signal;

sampling, according to a sampling period equal to T/N, the phase of the detected modulated signal, inside each symbol T period by means of a comb of sampling pulses obtained from N clock pulses evenly spaced out by a time interval equal to T/N;

computing the differential phase angle $d\phi$ separating each phase sample of a detected current symbol from the sample of the same order located in the symbol detected at the previous symbol period;

encoding each differential phase angle $d\phi$ in assigning it an encoding cost depending on its amplitude;

computing the sums of the encoding costs for samples of the same order belonging to a determined number L of consecutive symbols;

identifying, among the N sums obtained, that sum which gives the greatest result in memorizing the order occupied, in each symbol, by the corresponding samples;

taking, as a symbols synchronizing clock, to define the synchronization instants of the demodulator, that clock which, in the comb of pulses, has the same order as the order of the memorized sample;

and decoding the differential phase angle which possesses the same order as the memorized sample.

Another object of the invention is a demodulator for the implementation of the above method.

An advantage of the invention is that it enables fast acquisition of the symbol clock compatible with the length of the steps characteristic of frequency hop transmissions.

This result is obtained through the relatively simple method used to recover the clock symbol.

This simplicity results from the fact that the symbol clock is estimated according to one and the same concept irrespectively of the cause of the fluctuation of the rhythm, which may be due either to a constant delay between transmission and reception or to a frequency deviation of the reference frequencies of the stations, or again to a frequency deviation due to the Doppler effect, or again to the Gaussian noise that normally stains every transmission.

Furthermore, the performance characteristics as compared with prior art systems should normally be improved because the proposed system achieves a real filtering in phase and not in frequency, and because a finer correlation is obtained in the search for the synchronization.

BRIEF DESCRIPTION OF THE DRAWINGS

Other characteristics and advantages of the invention will appear below from the following description, made with reference to the appended drawings, of which.

DETAILED DESCRIPTION OF THE INVENTION

Figure 1:
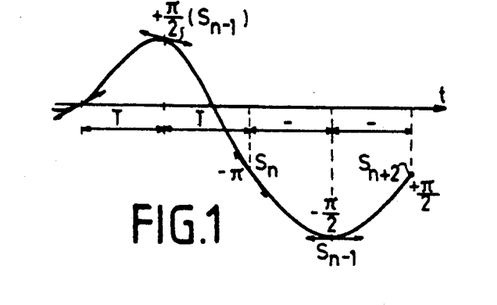
FIG. 1 shows a curve used to recall the principle of continuous phase modulation.

The curve of FIG. 1 recalls the relationship of variation in phase $\phi_{(t)}$ of a signal with a constant envelope, obtained according to the known principle of phase modulation under continuous phase. In this curve, the phase modulation under continuous phase. In this curve, the points marked 0, $+\pi/2$, $-\pi$, $-\pi/2$, etc. represent states assumed by the phase $\phi_{(t)}$ of the signal to transmit the different symbols $S_n$ that characterize a transmission, each symbol being represented by a defined phase state.

As described in the above-mentioned French patent, the same phase value and the same slope are given to the origin of each symbol $S_n$ and to the end of the symbol $S_{n-1}$ that precedes it. Furthermore, the maximum slope of the curve representing the phase $\phi_{(t)}$ is minimal between the successive phase states so as to reduce the width of the spectrum in terms of occupied frequency to the maximum extent. In adapting a third degree polynomial solution, the variation in phase between each symbol $S_n$ and $S_{n-1}$ is very small, and the width of the spectrum in terms of frequency occupied by the modulation is smaller than that occupied by the above-mentioned FSK or MSK type modulations.

Figure 2:
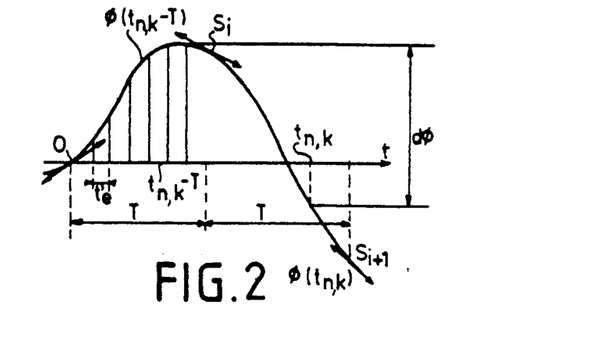
FIG. 2 shows the sampling principle implemented by the invention to obtain differential phase samples.

According to the invention, the phase $\phi_{(t)}$ of the signal is sampled in the way shown in FIG. 2 by a sampling comb, each tooth of which represents a possible synchronization clock.

The differential phase $d\phi(t_{n,k})$ measured between two successive samples is equal to:

$$d\phi(t_{n,k}) = \phi(t_{n,k}) - \phi(t_{n,k} - T)$$

with $t_{n,k} = nT + kt_e$ (1)

and $t_e = T/N$ where:
N is the total number of synchronization clocks,
$t_e$ is the sampling period of the differential phase
T is the symbol period
and k is a whole number between 0 and N−1.

To achieve decoding of the symbols in a reliable way, the symbol clock is estimated with precision in taking into account the fact that the instant of decision chosen for the decoding is evenly spaced out in the time of a symbol period, and that it does not necessarily coincide with the instant of synchronization.

Figure 3:
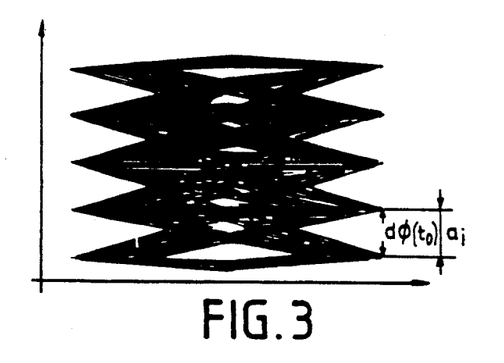
FIG. 3 is a known depiction of a diagram often called an "eye diagram", corresponding to a continuous phase modulation with five states.

The synchronization instant $t_o$ corresponds to that position, in the eye diagram in FIG. 3, where the synchronization data is the most dense. This instant is defined by a determined number of values of differential phase samples $a_i = d\phi(t_o)$ for which the minimum difference taken in terms of absolute value between two samples is the highest possible for the immunity to noise to be at its highest level.

Figure 4:
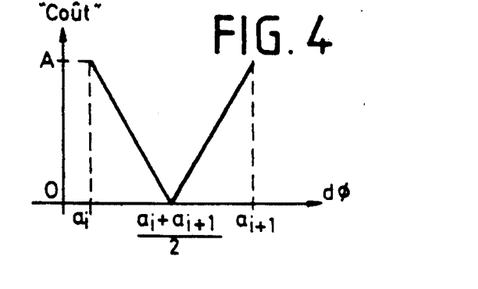
FIGS. 4 to 6 illustrate the cost functions used as a criterion of synchronization.
Figure 5:
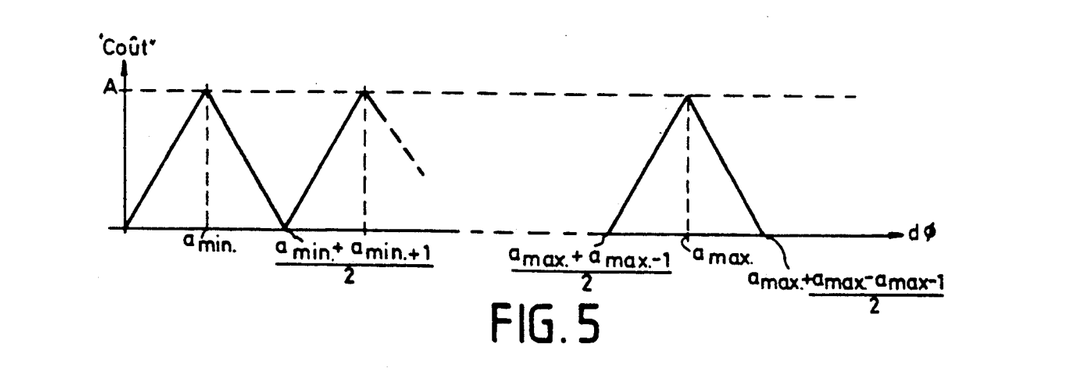

However, since the precise values of $a_i$ are never achieved because of the noise and because of technological imperfection, the instant of synchronization can be assessed only by estimating the distance between the values of the measured samples of the exact values of the samples $a_i$ that actually correspond to the instant of synchronization. This distance measures the probability of effectively finding the instant of synchronization and it is defined, hereinafter, by means of a cost function, a graphic depiction of which is shown in FIG. 4. This function has maxima of amplitude A when the differential phase $d\phi$ sample $a_i$ measured corresponds exactly to the synchronization instants and it has null values for the differential phase $d\phi$ samples located in the middle of the intervals between the exact and successive instants of synchronization. In the depictions of FIGS. 4 and 5, the variations of the cost function between each null amplitude point of the curve and the two directly neighbouring points having maximum amplitudes A are linear, with the corresponding straight lines having opposite slopes. However, according to other alternative embodiments of the invention, the linear variation mode could be replaced by polygonal variation modes.

The maximum amplitude A of the cost is fixed by the width of a statistical window counted in terms of the number of symbols and, possibly, of the limits laid down by the specifications (length of an frequency hopping step for example).

For the samples aimin and aimax corresponding to the end symbols of the window, the symmetry of the cost function is that shown in FIG. 5.

Figure 6:
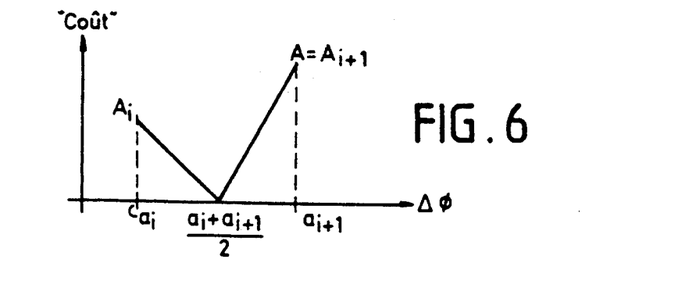

An alternative that takes into account a lack of equal probability of the samples $a_i$ is shown in FIG. 6. According to this alternative, each cost function pertaining to a sample $a_i$ of a symbol $S_i$ has a maximum amplitude $A_i$ which is inherent to it. This amplitude $A_i$ is defined by the relationship:

$$A_i = A \times P_i / P$$

where A designates the maximum amplitude possible and $P_i$ designates the probability of obtaining the synchronization instant $t_o$ identified with the differential phase $d\phi$ sampling instant.

The clock is estimated by choosing the estimate which is closest to the position in time of the sequence of order $a_i$ samples of each symbol, for which the total of the costs, accumulated on L consecutive symbols and measured by means of the above-described cost function, is maximum. This statistical estimate is done, for a mode of transmission in packets or by frequency hopping, on the number L of symbols of a packet or of a frequency hopping step. To each symbol clock with an index k of a set of N clocks, there corresponds a statistical estimate described by relationship of the form:

$$S_{(k)} = C(d\phi(t_{no,k})) + C(d\phi(t_{no-1, k})) + \cdots + C(d\phi(t_{no+L,k})) \quad (2)$$

If $k_e$ designates the estimated synchronization clock, it is defined by the sum $S_k$ which has the greatest result.

Following this estimate, two operations are performed:

The first operation consists on correcting the clock of the demodulator to enable it to be reset to the previously estimated clock $k_e$ instant.

The second operation consists in deciding on the decoding.

The correction of the demodulation clock is done through an internal sequencing of the demodulator and is performed in the direction returning to the symbol clock, taken as a reference, at the initial instant. This instant can be chosen as the middle of the time range covered in a symbol by all the clocks of the comb. Since the decision clock of the decoding is not necessarily identified with the synchronization clock, but may have a constant difference with the synchronization clock, the instant of decision of the decoding should also be defined by a translational movement in the same direction as that done for the synchronization instant.

Figure 7:
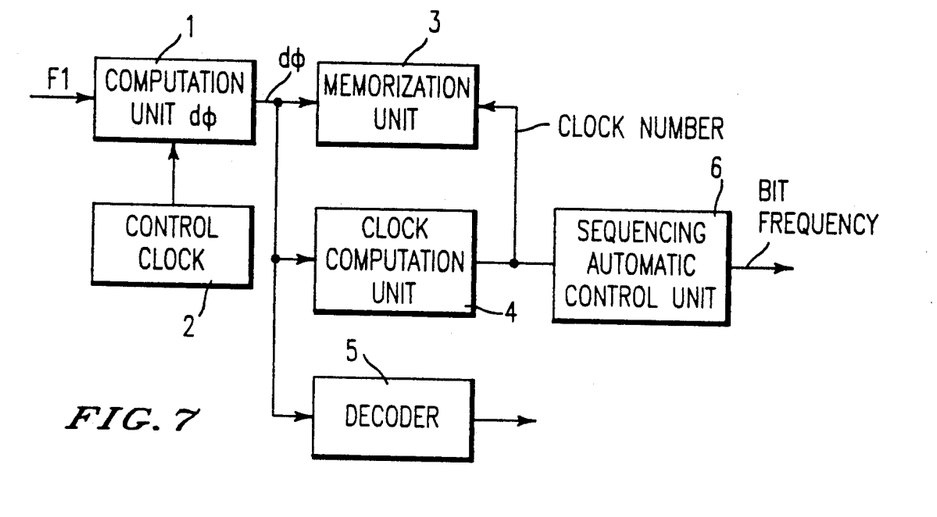
FIG. 7 shows an embodiment of a demodulator according to the invention.

An embodiment of a demodulator according to the invention is shown in FIG. 7. It has a unit 1 for the computation of the differential phase $d\phi$, driven by a control clock (He)2 and coupled to a memorization unit 3, to a synchronization clock computation unit 4 and to a decoder 5. The synchronization clock computation unit 4 is further coupled to the memorizing unit 3 and a sequencing and automatic control unit 6.

Figure 8:
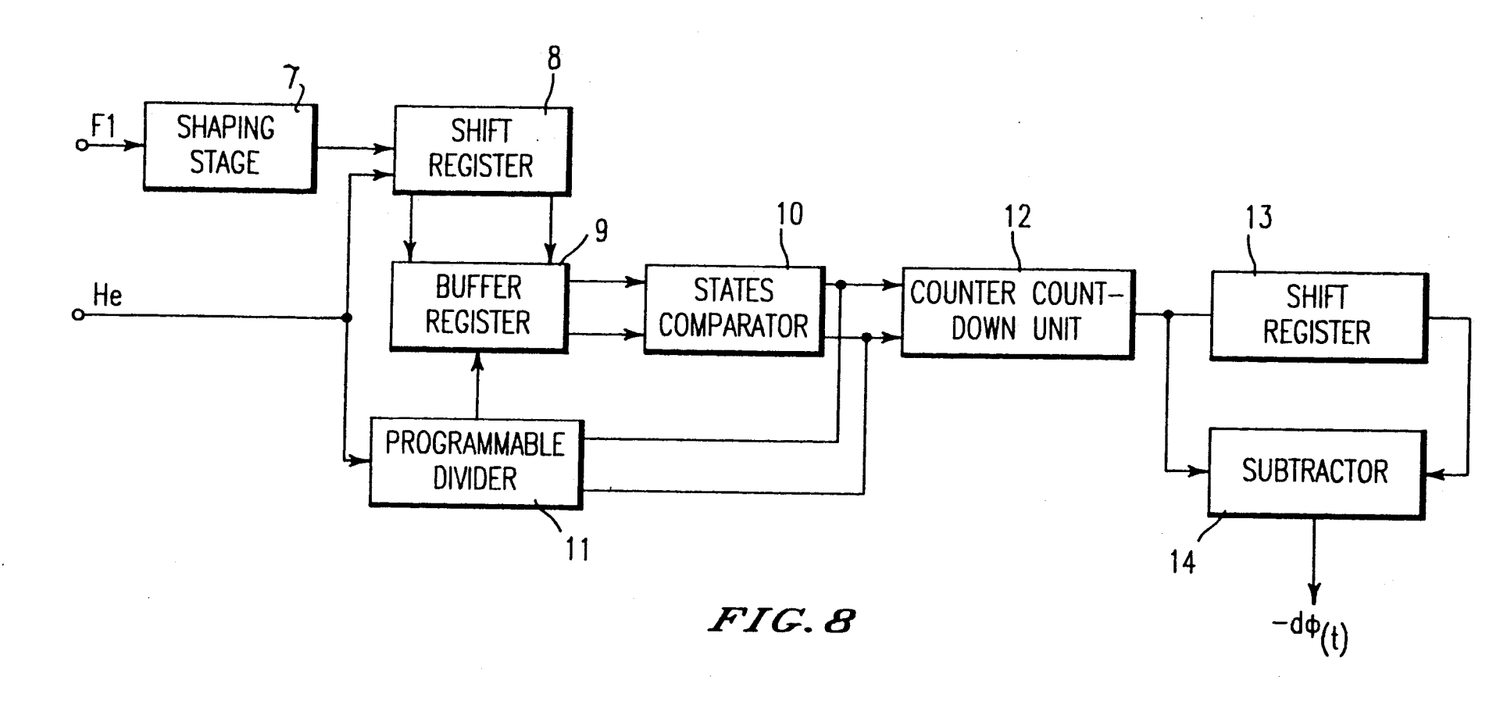
FIG. 8 shows an embodiment of the differential phase computation unit of FIG. 7.

The differential phase computation unit 1 is shown in detail in FIG. 8. It has a shaping stage 7, connected to a shift register 8. The shift register 8 is coupled to a phase locking loop consisting of a buffer 9, a states comparator 10 and a programmable divider 11. The states comparator 10 is connected to a shift register 13 through a phase counter/countdown unit 12. The phase counter/countdown unit 12 is connected to a first operand input of a subtractor circuit 14. The second operand input of the subtractor circuit 14 is connected to this shift register 13.

The differential phase computation unit 1 is the functional input of the demodulator. Its role is to put the baseband radio signal FI, coming from the standard frequency transposition systems (not shown) and obtained in a known way at the output of the intermediate frequency stages of a receiver, into binary form.

This function is fulfilled in a known way by the shaping stage 7 using, for example, a voltage comparator circuit (not shown) capable of working at frequencies and voltages that are compatible with the input signal. To this effect, two types of shaping could be achieved. A first shaping may consist in comparing the input signal $F_1$ with the mean value of the latter and, in this case, the comparator should be provided with a hysteresis system to prevent instability in the event that the input signal is low. A second shaping may consist in comparing the input signal FI differentially. The advantage of this latter type of comparison is that it enables perfect transcription of the points where the amplitude of the input signal gets cancelled. The second function fulfilled by the computation unit 1 is the computation of the differential phase computation $d\phi$ itself. The first operation performed consists in creating a digital signal from the control clock, capable of being compared in phase with the input signal. This is ensured continuously by a phase locking loop. This loop comprises, in FIG. 8, the elements 8 to 11.

The register 8 contains the samples of the input signal, and its content is renewed with a precision and periodicity equal to those of the programmable divider 11.

The buffer register 9 enables stabilization of two samples of the signals taken successively, and makes it possible to do this at the control clock frequency (He).

The states comparator 10 provides for a comparison among the magnitudes of the samples contained in the register 9. It thus gives, at its output, two pieces of information qualifying the increase and decrease in phase of the input signal. Its temporal development has a precision that is fixed by the ratio of the control clock He and the input signal. The sampling pitch is, for example, 10° if the ratio is 1/36th of the period of the input signal.

The two pieces of information on phase lead ($+10°$ in the example) and phase delay ($-10°$ in the example) given by the states comparator 10 are applied to the input of the circuit 11.

The counter/countdown unit 12 tabulates the leads and delays in phase given by the states comparator 10. A phase lead increases the content of the counter 12 by one unit, and a delay reduces its content by one unit.

Under these conditions, the output of the counter/countdown unit 12 can give the absolute phase $\phi_{(t)}$ of the input signal from any instant of use, at the value 0, of the content of the counting/countdown unit 12.

The shift register 13 has a FIFO (first in first out) register and forms, with the subtractor circuit 14, the differential phase computing element proper. The subtractor circuit 14 further receives the successive phase samples $\phi_{(t)}$ coming from the counter/countdown unit 12, and receives, in subtraction, the successive phase samples $\phi_{(t-T)}$ coming from the shift register 13, for which the fixed number of shifts is equal to the ratio of the sampling frequency He of the modulating signal to the frequency of the modulating signal itself (H symbol). The phase deviation $d\phi_{(t)}$ obtained at the output of the subtractor circuit 14 verifies the relationship:

$$d\phi_{(t)} = -\phi_{(t)} - \phi_{(t-T)}$$

where t designates the present instant and T designates the period of the modulating signal, said period being the same as the above-described symbol period.

The differential phase samples $d\phi_{(t)}$ are transmitted to the input of the memorization unit 3. This unit shown in FIG. 9 has a random access memory 15 addressed by an address selector 16 and by the output of a subtractor circuit 17. The memory 15 enables the recording and the re-reading of the samples of the differential phase $d\phi_{(t)}$ obtained from the computation unit 1. The selector 16 has two inputs. A first input receives the decoding clock number while the other is connected to the output of the sample counter 18. The subtractor circuit 17 has two operand inputs. A first operand input marked ($+$) is connected to the output of a symbol counter 19. The second operand input marked ($-$) receives, in the form of a binary word, the number of symbols L to which the above-described statistical computations relate. The symbol counter 19 works apace with the pulses given by a divider circuit 20. This circuit 20 performs a division by the number N of samples contained in a symbol of the sampling frequency Fe.

To recover the pieces of information, notably the rhythm and the characters of the modulation, the modulating signal received and the differential phase $d\phi_{(t)}$ computed should undergo an oversampling with constant shift. This sampling is chosen so as to be N times greater that the symbol frequency, and the shift between samples is 360/N° of the phase of the modulating signal.

To this end, the synchronization clock computation unit 4 operates by sliding processing on the consecutive symbols corresponding to the length of the statistical processing.

Figure 9:
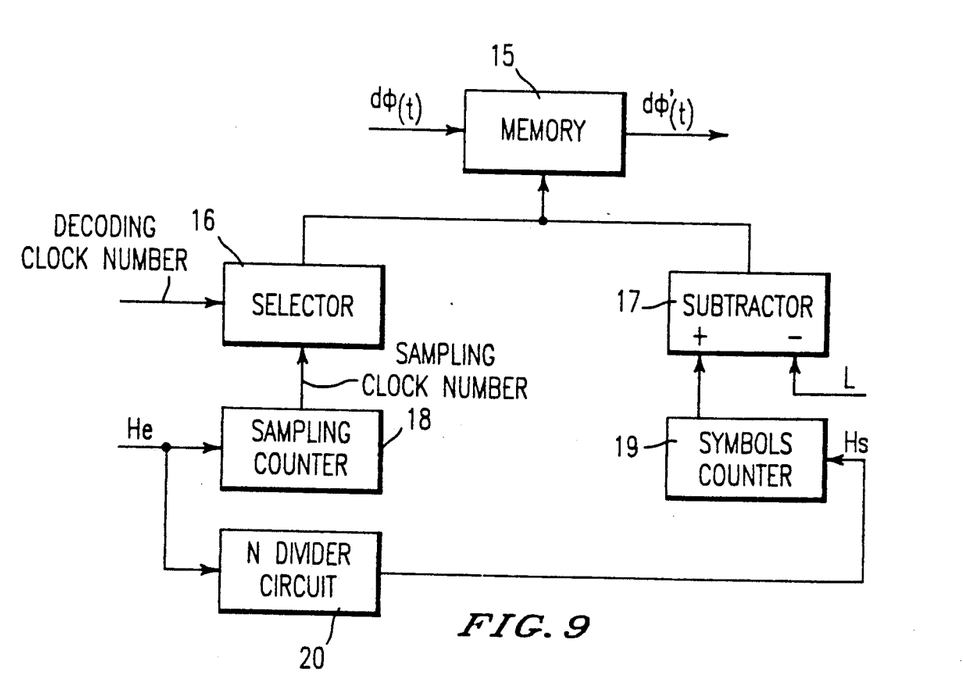
FIG. 9 shows an embodiment of the differential phase memorizing unit of FIG. 7.

To meet these conditions, the memory 15 is organized to store N+L samples of the differential phase, and its working is similar to that of a shift register. Its structure is preferably that of a random access memory, to enable flexible operation in frequency hop mode or in data packet transmission mode.

The memory 15 is addressed by means of the circuits 16 to 20.

The selector 16 provides for switching over between two distinct operating modes, writing mode or reading mode, of the memory 15.

The writing mode enables the recording, in the memory 15, of the differential phase samples $d\phi_{(t)}$ coming from the computation unit 1.

The addressing is defined to enable each last sample $d\phi_{(t)}$ that arrives at a given instant to to take the place of the sample which was recorded at the time $t=t_o--LT$, namely L symbols earlier. The identification of the memory slot concerned is given by the contents of the counters 18, 19, 20. In the reading mode, the differential phase $d\phi'_{(t)}$ sample taking the place of the next sample to come is directed to the computation unit of the synchronization block 6. However, the reading mode is also put into action to transmit the differential phase $d\phi_{(t)}$ sample to the decoder 5, the clock number of which has been recognized as having the greatest probability of being the one corresponding to the synchronization clock. The combined operation of the selector 16 and the subtractor 17 can be used to make the memory work in the mode of addressing by packets, the selector 10 being controlled to select the decoding clock, the input marked (−) of the selector 11 receiving a binary number between 0 and L.

Figure 10:
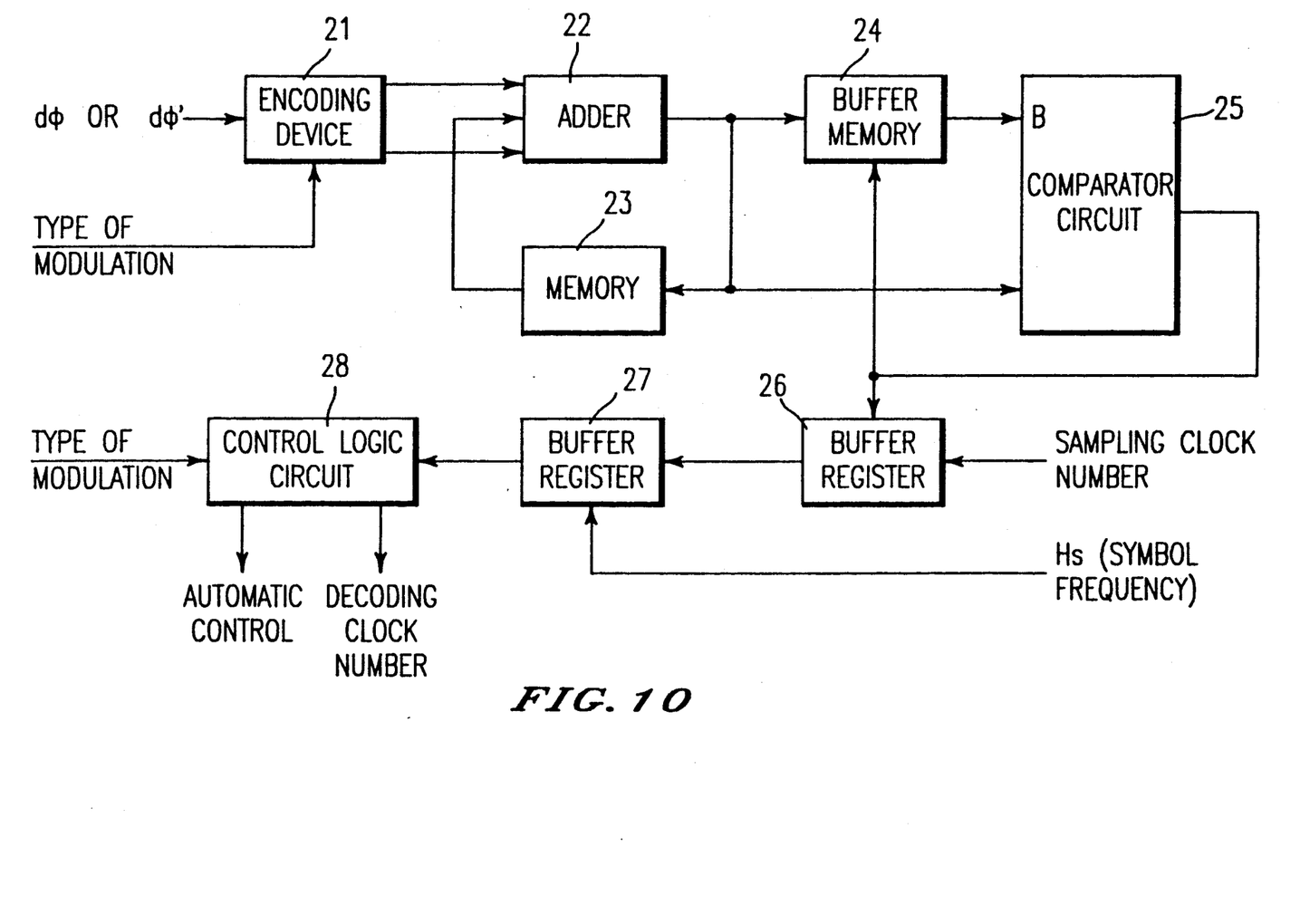
FIG. 10 shows an embodiment of the synchronization clock computation unit of FIG. 7.

The synchronization clock computation block shown in FIG. 10 consists of four parts.

The first part has an encoding device 21 formed by a read-only memory or any equivalent device that enables the encoding of the differential phase samples. The encoding is done by applying the above-described cost function to each differential phase $d\phi_{(t)}$ sample. The memory of the decoding device 21 is addressed, firstly, by the arriving phase sample $d\phi_{(t)}$ and by the sample already stored in the memory 15 at the instant $t=t_o-LT$.

The second part has an adder circuit 22 and a random-access memory 23.

The memory 23 has a role of an accumulator for the adder circuit 22. It has a stack N accumulating registers organized in the FIFO mode. The adder circuit 22 adds, to each piece of data read, leaving through the last register of the stack, the transforms ($C.d\phi_{(t)}$ and $Cd\phi'_{(t)}$) by the above-described cost function and differential phase samples $d\phi_{(t)}$ and $d\phi'_{(t)}$. Each result of the addition computed by the adder circuit 22 is stored in a first register of the stack, the contents of each accumulating register of the memory 23 being pushed successively into the following registers of the stack at each new result given by the adder circuit 22, the additions and shifts taking place at the sampling frequency N/T.

Thus, from the sum of the L last costs obtained for each sequence of samples with an interval between them of N, there is deducted the cost $C.d\phi'_{(t)}$ leaving the memory 15 and there is added the cost $C.d\phi'_{(t)}$ entering the memory 15.

The third part of the synchronization clock computation unit has a buffer memory 24, a higher-value comparator circuit 25 and a buffer register 26. Its function is to identify, in the N sums of the costs which are constantly updated in the memory 23 by the adder circuit 22, that value which gives maximum amplitude, said identification taking place in real time with the binary throughput of the modulation, namely at the symbol frequency 1/T. Each maximum cost sum is memorized in the memory 24 where it remains for as long as a new sum is not found to replace it. This memorizing is controlled by the higher-value comparator circuit 25 which, at all times, compares the content of the buffer memory 24 with each of the sums of the costs computed by the adder circuit 22. The higher-value comparator circuit 25 also gives a control signal to the buffer register 26 to memorize each new sample number giving rise to a new maximum of the cost function.

At every N samples, the memory 24 has, in memory, the greatest sum of the costs, and the buffer register 26 has the clock number associated with this sum. The clock number is then transferred into a buffer register 27 connected to the buffer register 26, and the previous process is repeated.

The fourth part of the synchronization clock computation unit has a control logic 28 which acts according to the clock number memorized in the buffer register 27.

Depending on the type of modulation used, the control logic gives the decoder 5 the number of the decoding clock found in the buffer register 27 and a piece of information to control the sequencing and automatic control unit 6 of the demodulator.

The decoding of the differential phase is done by the decoder 5. This decoder 5 decodes the differential phase sample, the clock number of which is the one chosen by the cost function.

To enable the demodulator to work with several different types of modulation, a specific programmed memory of each modulation can be included in the decoder 5, and, after this memory, it is possible to envisage several different types of output circuit to suit the working of the demodulator to the different types of transmission.

The demodulation method and the demodulator, that have just been described, have acceptable performance values if the frequency deviation of the carrier remains small. The frequency deviation on the radio carrier is related to the difference in frequency between the control clocks of the transmitter stations and receiver stations. This deviation may be, for example ±1 kHz for a carrier frequency of 100 MHz with a control clock frequency of 5MHz at $\pm 10^{-5}$. To this value or from it, there should be added or deducted the deviation inherent in the Doppler effect which is estimated for land vehicles at $\pm 10^{-7}$ times the frequency of the radio carrier. This corresponds, in the previous example, to a deviation of ±10Hz. For air/ground links or links between aircraft, the value of the deviation due to the Doppler effect is greater and may reach $\pm 2 \times 10^{-6}$ times the frequency of the radio carrier. In the previous example, this gives ±200 $H_z$ of deviation. This deviation effect results in a positive or negative shifting of the differential phase. With, for example, a symbol frequency, F symbol, of 25 KHz and a deviation $\Delta f$ estimated at ±1KHz we get $\Delta f/F$ symbol = ±0.04 namely, a shift of ±15° of the differential phase. Consequently, the presence of deviations causes a shift in the symbolic characters proper to the phase modulation used. For major deviations, the above-described method and demodulator should be adapted to take into account these deviations and the fact that estimation of the deviation and of the sampling clock should be done in very short periods, smaller than the duration of the steps, containing the useful data, in frequency hop transmission systems. This problem can be resolved by making a simultaneous estimate of the reception sampling clock and of the deviation of the carrier. In fact, the deviation on the carrier can be estimated through the off-centering observed on the differential phase. Consequently, this deviation can be estimated in degrees per symbol period.

Instead of using a cost function with its parameters based on the reception sampling instant, the method implemented uses a cost function with its parameters based on a vector, the two components of which are the sampling clock and the deviation.

It is possible to represent this cost function, with the sampling clock parameter being fixed, since this function is does not vary, by translation of said parameter. This function can be depicted in a three-dimensional space, a first lane being formed by the axis of the deviations on the carrier and the axis of the differential phase, the y-axis representing the cost being perpendicular to this plane. The same cost function described above, with reference to FIGS. 4 to 6, can then be used. This function acts as a reference for the computations because it corresponds to the case where the deviation on the carrier is null. The reference function can be considered to be the projection of a general cost function on the equation plane: deviation=0.

The projections of the general cost function on the equation planes, deviation = $C^{te}$, are obtained by translation of the differential phase parameter of the quantity given by the deviation.

Figure 11:
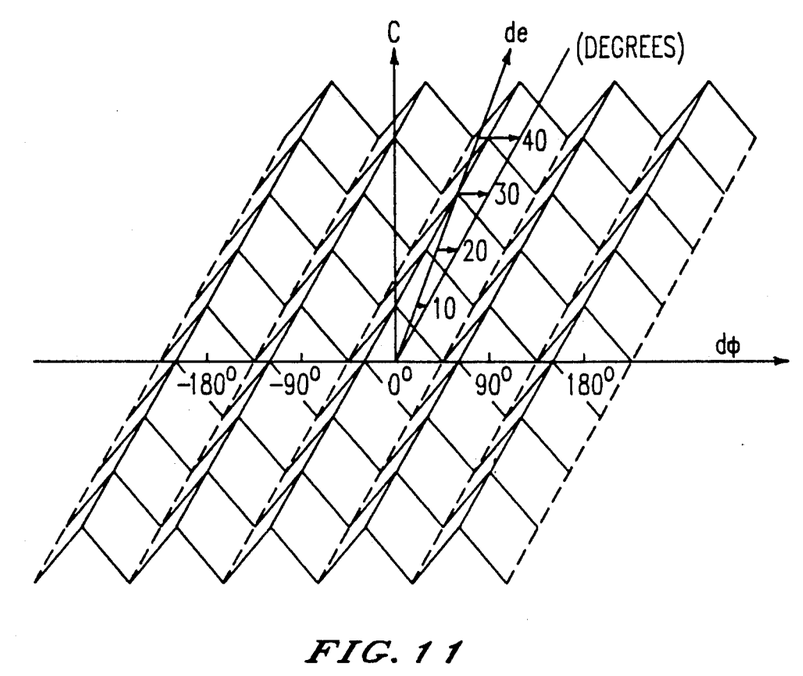
FIG. 11 shows a three-dimensional graph of the distribution of the cost function taking into account the frequency deviation of the carrier.
Figure 12:
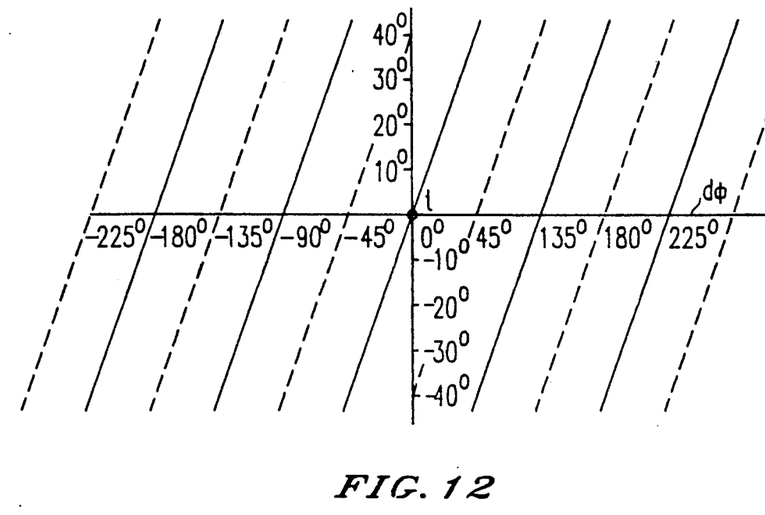
FIG. 12 shows a top view of the graph of FIG. 11.

A depiction of the projections is shown in FIGS. 11 and 12.

The estimated parameter is the parameter that maximizes the static thus obtained.

With the preceding notations and the addition of a deviation $d_e$ parameter, the statistical estimation (2) becomes:

$$S(k,d_e) = C(d\phi_{(tno,k)},d_e) + C(d\phi_{(tno+1,k)},(d_e) + \ldots + C(d\phi_{tno+L,k)},d_e) \quad (3)$$

Figure 13:
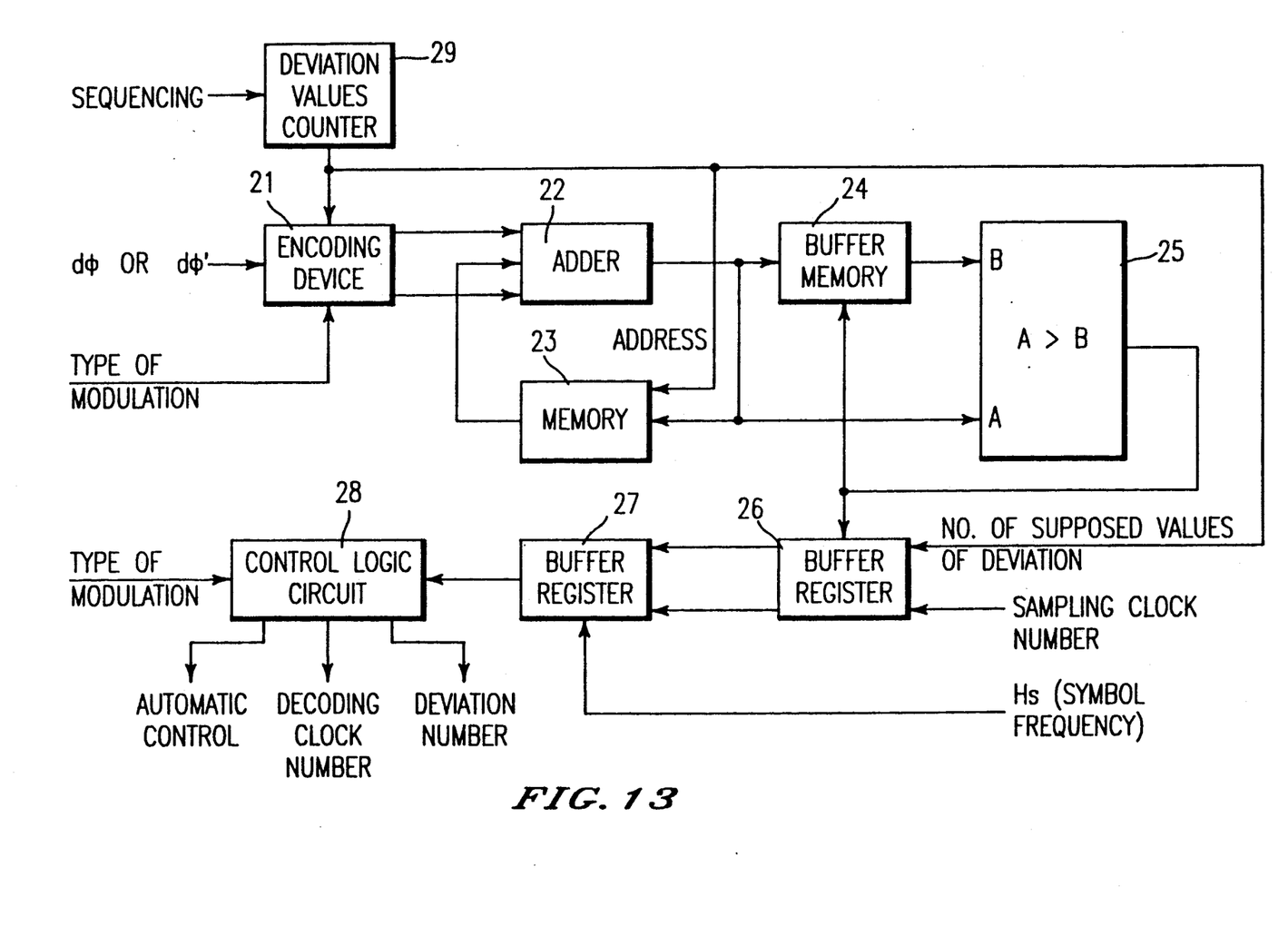
FIG. 13 shows an embodiment of the demodulator of the invention provided with a deviation correcting device.

To compensate for the effect of this deviation and to estimate its value in degrees per symbol, the synchronizing clock computation unit is modified as shown in FIG. 13, where the elements similar to those of FIG. 10 are shown with the same references, by adding on a deviation counter 29 and introducing the costs encoding tables into the encoding device 21 addressed by the counter 29 to take into account the deviation parameter. The computation unit shown in FIG. 13 performs, for each discrete value of the supposed frequency deviation, the sum of the L last costs indexed by the same number of the sampling clock.

This computation is achieved by the adder 22 and the memory 23 in a way similar to that done by the computation unit of FIG. 10 except, however, for the number of partial sums to be compared which is equal to N times the number $n_d$ of discrete deviation values taken into account. For this, the memory 23 should contain as many stacks of registers as there is a number $n_d$ of discrete deviation values. The buffer memory 24 memorizes, as above, the sum of the costs that has maximum value, the latter being indexed both with the number of the sampling clock and the supposed value of the deviation.

In the diagram of FIG. 13, the supposed value of the deviation is transmitted by the deviation counter 29 to the interior of the buffer register 26. The buffer register 26 thus has, at the end of the reference symbol period, the supposed value of the deviation and the clock number which have given the sum of the highest of the last L costs, i.e. one among the $Nn_d$ sums. These values are transmitted, as in FIG. 10, into the buffer register 27. To enable the decoding of the symbols, the decoder 5 of FIG. 7 should receive the differential phase element or elements that are assigned the right shift clock number given by the control logic circuit 28 and the value of the frequency deviation also contained in the buffer register 27 and given by the control logic 28. The value of the frequency deviation is applied to an input of the decoder 5 to enable it to perform the translation of the differential phase of the symbols to be decoded.

What is claimed is:

1. A method for the demodulation of digital signals continuously modulated in phase and/or frequency, the digital signals consisting of sequences of symbols that have the same duration T and are juxtaposed with one another in time, the symbols being transmitted by means of phase and/or frequency jumps, and method consisting in:

detecting the phase of the signal modulated in the form of a signal with an amplitude that is variable as a function of the phase variations of the modulating signal;

sampling, according to a sampling period equal to T/N, the phase of the detected modulated signal, inside each symbol T period by means of a comb of sampling pulses obtained from N clock pulses evenly spaced out by a time interval equal to T/N;

computing the differential phase angle $d\phi$ separating each phase sample of a detected current symbol from the homologue sample located at the same place in the symbol detected at the previous symbol period;

encoding each differential phase angle $d\phi$ in assigning it an encoding cost depending on its amplitude;

computing the sums of the encoding costs for homologue samples located in the same place in each symbol and belonging to a determined number L of consecutive symbols;

identifying, among the sums of the encoding costs obtained, the sum which gives the greatest result in memorizing the place number occupied, in each symbol, by the corresponding samples;

taking, as a symbols synchronizing clock, to define the synchronization instants of demodulator, that clock which, in the comb of pulses, matches with the memorized place number;

and decoding the differential phase angle which matches the memorized place number sample.

2. A method according to claim 1, wherein the encoding cost has a maximum value when the computed differential phase angle corresponds to the instants of synchronization and a null value in the middle of the interval between the consecutive instants of synchronization.

3. A method according to claim 2, wherein the law of variation of the encoding cost is linear.

4. A method according to claim 2, wherein the law of the encoding cost is nonlinear.

5. A demodulator of digital signals, continuously modulated in phase and/or frequency, the digital signals consisting of sequences of symbols that have the same duration T and are juxtaposed with one another in time, the symbols being transmitted by means of phase and/or frequency jumps, comprising:

a shaping circuit to detect the phase of the signal modulated in the form of a signal of an amplitude variable as a function of the variations in phase of the modulating signal, and to sample the signal of variable amplitude obtained according to the sampling period T/N, a unit for the computation of the differential phase angle $d\phi$ between each phase angle of a detected current symbol of the homologue sample located at the same place in the symbol detected at the previous symbol time, a memorizing unit to memorize, for a duration of L symbols, each differential phase sample $d\phi$;

an encoding device to encode each differential phase angle give by the computation unit, and the differential phase angle of a same order memorized in the memorization unit computed L symbols earlier, in assigning them as encoding cost that depends on their amplitude, an adder/accumulator circuit to mutually substrate the costs that are computed by the encoding device and separated in the time of the duration of L symbols, and to add to the result of the subtraction during the period of L symbols; the encoding costs obtained for the samples of the same order inside each sample, a comparison circuit to identify, among the same obtained, that sum which gives the greatest result, a buffer register to memorize the the place number occupied in each symbol by the sample that has contributed to obtaining the sum giving the greatest results, a control logic to select the synchronization clock has the which matches with the place number of the memorized sample and a decoder to decode the differential phase angle corresponding to the place number of the sample memorized in the buffer register.

6. A demodulator according to claim 6, wherein the encoding circuit comprises a programmable read-only memory to memorize, in the form of tables, the different costs to be assigned to each differential phase computed by the computation unit.

7. A demodulator according to claim 6, further comprising a deviation counter controlled by the symbol frequency to estimate the deviation of the digital signal to address the cost tables as a function of the estimated deviation.

8. A demodulator according to claim 6, wherein the deviation counter transmits the value of the estimated deviation to the decoder through the buffer register and the control logic to perform a translation equal to the value of the deviation of the differential phase of the symbols to be decoded.

9. A demodulator according to claim 8, wherein the adder/accumulator circuit is controlled by the deviation counter.

* * * * *